Nov. 24, 1970     P. B. CATE     3,541,773

TREE CROP HARVESTER

Filed May 24, 1968     4 Sheets-Sheet 1

INVENTOR
Pledger B. Cate

BY
ATTORNEYS

Nov. 24, 1970    P. B. CATE    3,541,773
TREE CROP HARVESTER
Filed May 24, 1968    4 Sheets-Sheet 3

INVENTOR
Pledger B. Cate
BY
ATTORNEYS

Nov. 24, 1970     P. B. CATE     3,541,773
TREE CROP HARVESTER
Filed May 24, 1968     4 Sheets-Sheet 4
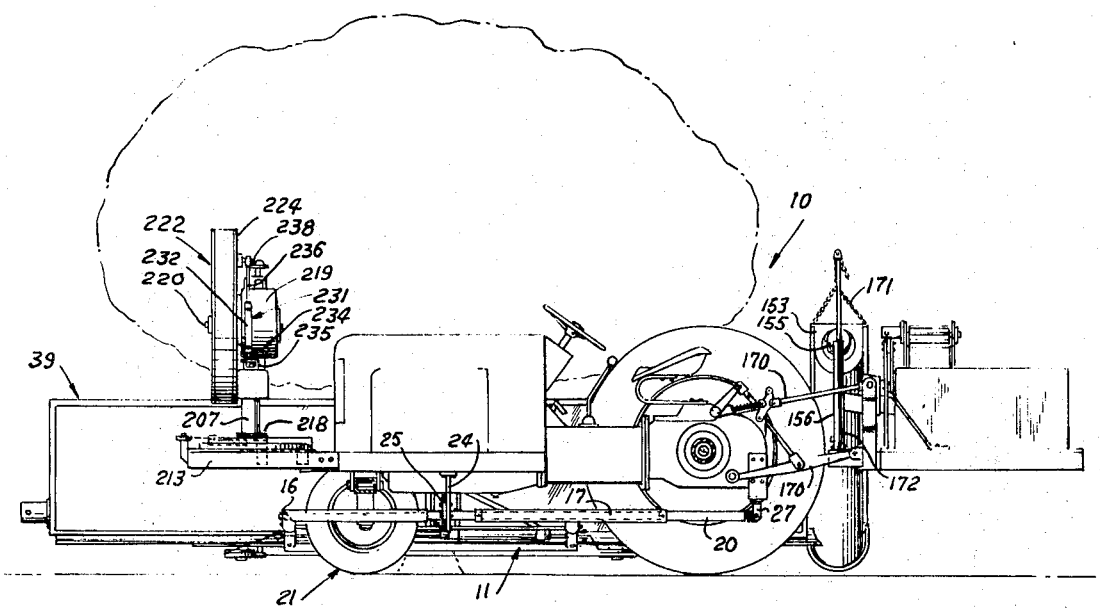
Fig. 6
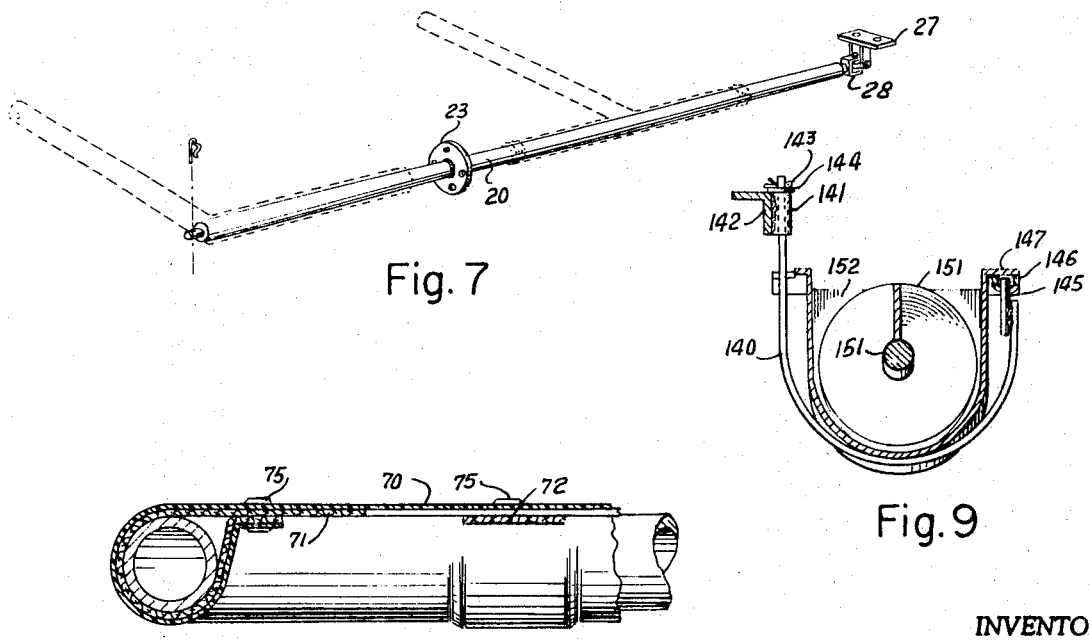
Fig. 7
Fig. 8
Fig. 9
INVENTOR
Pledger B. Cate
BY
ATTORNEYS

United States Patent Office 3,541,773
Patented Nov. 24, 1970

3,541,773
TREE CROP HARVESTER
Pledger B. Cate, Rte. 2, Box 202,
Mexia, Tex. 76667
Filed May 24, 1968, Ser. No. 731,859
Int. Cl. A01g *19/08*
U.S. Cl. 56—329                                    13 Claims

ABSTRACT OF THE DISCLOSURE

An apparatus for harvesting fruits, nuts and the like from trees which is mountable on a tractor to extend longitudinally along and laterally outwardly of one side of a tractor and includes an inner catcher which is tiltable toward a longitudinally extending conveyor of the apparatus and a pair of outer catchers which are movable between outer operative positions wherein they are tilted toward the conveyor and inner inoperative positions over the inner catcher. The apparatus also includes a blower movably mounted on the tractor for blowing the fruit or nuts from the tree to fall upon the catchers and roll thereon to the longitudinal conveyor.

---

This invention relates to harvesters and more particularly to a harvester for harvesting tree crops such as fruits and nuts.

An object of this invention is to provide a new and improved tree harvester which is easily mountable on the tractor and is operable by the operator of the tractor without requiring the dismounting of the operator from the tractor.

Another object is to provide a tree harvester wherein the operative components thereof may be moved to retracted positions adjacent the harvester during the transport of the harvester from one location to another.

Still another object is to provide a harvester of the type described having a main frame which extends laterally outwardly from a side of a tractor and is movable between a lower operative position and an upper or inoperative position, an inner catcher which is pivotally secured to the main frame and movable between an operative position where it is inclined downwardly and outwardly toward a conveyor mounted on the main frame, and a pair of outer catchers which are pivotally mounted on the inner frame and movable between operative positions wherein they extend downwardly toward the conveyor and inoperative positions wherein they extend over the conveyor and the inner deflector, the catchers when in their operative positions extending about the trunk of a tree and below its branches.

A further object is to provide a harvester of the type described wherein the tractor may be driven to a position where the middle of its longitudinal conveyor is positioned closely adjacent the trunk of a tree with the outer catchers in their inner inoperative positions so that the outer catchers may then be moved from their inoperative to their operative positions whereby the catchers are positioned below the branches of the tree and about its trunk to catch fruit or nuts falling from the tree and direct them to the longitudinal conveyor.

A still further object is to provide a tree harvester of the type described having a blower movably mounted on the tractor to direct a current of air of relatively high velocity at the branches of the tree to dislodge the fruit or nuts therefrom to cause them to fall by gravity onto the catchers and move by gravity over the inclined catchers to the longitudinally extending conveyor.

Another object is to provide a tree harvester wherein the longitudinally extending conveyor moves the fruit longitudinally rearwardly of the tractor and catchers to an elevator conveyor which then transports the fruit upwardly to receptacles carried by the tractor.

Still another object is to provide a tree harvester of the type described which is of very light weight so that it may extend laterally outwardly a substantial distance from the tractor on which it is mounted.

A further object is to provide a tree harvester having operator means for moving the various elements of the harvester between their operative and inoperative position which are operable from the seat of the tractor.

Additional objects and advantages of the invention will be readily apparent from the reading of the following description of a device constructed in accordance with the invention, and reference to the accompanying drawings thereof, wherein:

FIG. 6 is a side view of the harvester with its elements in their operative positions;

FIG. 7 is a perspective view showing the means for supporting the harvester on a tractor;

FIG. 8 is an enlarged fragmentary sectional view taken on line 8—8 of FIG. 1;

FIG. 9 is a sectional view taken on line 9—9 of FIG. 1; and

FIG. 10 is a schematic illustration of the hydraulic system for operating the harvester.

Figure 1:
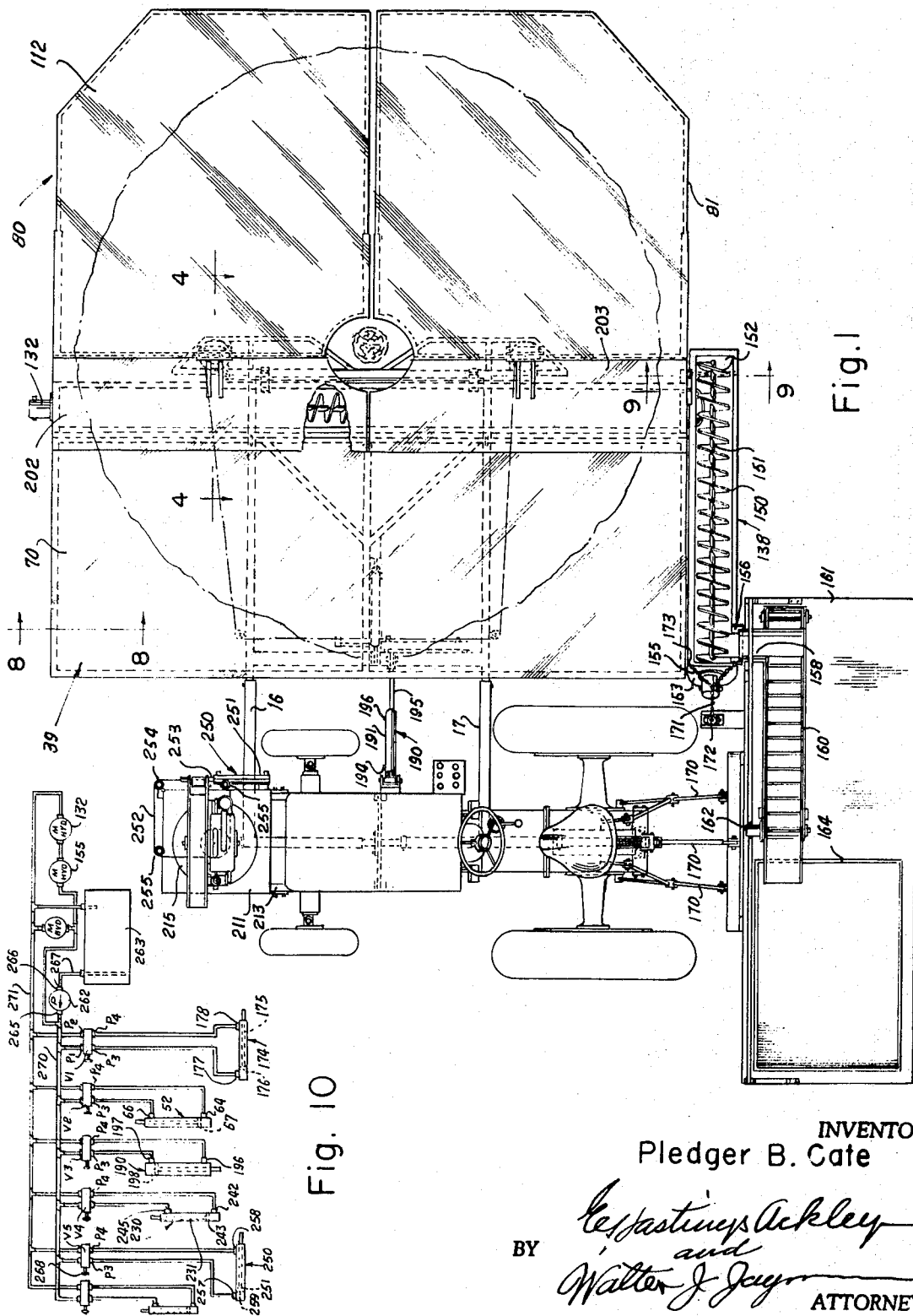
FIG. 1 is a top plan view of the tree harvester, with some parts broken away and some removed for clarity of illustration.

Referring now to the drawings, the tree crop harvester 10 embodying the invention includes a main frame 11 having a pair of side members 12 and 13 which are connected intermediate their ends by an inner channel cross member 14 so that their inner end portions may telescope into the forwardly extending tubular socket members 16 and 17 and are secured thereto by bolts 17a. The tubular portions 18 and 19 of the socket members are rotatably disposed on a support shaft 20 and held thereon by collars 21 secured to the support shaft by set screws or the like and a cotter key 21a. The support shaft extends longitudinally below the tractor or vehicle 22 on which the harvester is mountable. The support shaft may have an annular mounting flange 23 which is rigidly securable to a downwardly extending bracket 24 secured to the tractor frame by means of bolts 25 which extend through aligned apertures in the flange and the support bracket 24. The rear end of the support shaft is preferably secured to the usual draw bar bracket 27 by a suitable coupling 28. The main frame 11 at its outer end portion includes an outer cross member 31 which extends between the side members 12 and 13 and at its forward end with brace frames 32 and 32a. The front brace frame 32 has a brace member 33 disposed outwardly of the outer cross member 31 and secured thereto by its angular portions 34 and 35, a rear portion 36 and a central portion 37.

The rear brace frame 32a is similarly secured to the cross member 31 of the main frame and, accordingly, elements of the brace frame 32a have been provided with the same reference numerals, to which the subscript *a* has been added, as the corresponding elements of the front brace frame 32.

An inner catcher or deflector 39 of the harvester has a frame 40 which includes inner and outer longitudinal members 41 and 42 connected by side members 43 and 44. The outer member 42 is pivotally secured to the side members 12 and 13 by means of U-bolts 46 which extend through suitable apertures provided in the side members. The frame also includes a central brace member 48 which extends between the longitudinal members and brace members 49 and 50 between the central brace member and the outer longitudinal member. The inner catcher frame is movable between its operative upper position illustrated in FIGS. 3 and 6, wherein it is inclined upwardly and toward the tractor, by a hydraulic ram 52 whose cylinder is pivotally secured to the main frame member 14 by its lug 54 which extends between the pair of arms 55 of the main bracket and a bolt or shaft 56 which extends through aligned apertures in the arms and the lug. The outer end of the piston rod 58 of the hydraulic ram is pivotally secured to a plate 59 of the side inner catcher frame which is secured to the brace member 48 and 50 by means of a clevis 60 at the outer end of the piston rod and bolt or shaft 61 which extends through the aligned apertures in the clevis and a downwardly extending lug of the plate 59.

It will be apparent that when hydraulic fluid under pressure is introduced to the cylinder through the port fitting 64 of the cylinder and allowed to exhaust from the cylinder through the opposite port fitting 66, the piston 67 will move to its extended position and raise the frame and, conversely, when hydraulic fluid under pressure is introduced to the cylinder through the port fitting 66 and allowed to exhaust through the port fitting 64, the piston will move to its retracted position and will move the catcher frame to its lower position on the main frame.

The catcher frame 40 has a plastic sheet 70 stretched thereacross and supported thereon by means of a plurality of spaced longitudinal straps 71 which extend between the side members 43 and 44 and transverse straps 72 which extend between the longitudinal members 41 and 42. The ends of the straps are wrapped around the frame members and are secured in stretched position by means of rivets or eyelets 75. The peripheral edge portions of the sheet are also wrapped around the frame members and secured to the body of the sheet inwardly of the frame member and also to the straps by similar eyelets or rivets.

A front outer catcher or deflector 80 is swingably or pivotally movably mounted on the outer brace frame 32 by means of a mount assembly 81 mounted on a plate 82 rigidly secured between the brace members 36 and 35, as by welding, and which has a bearing or bushing 83 secured thereto. The support assembly includes a disc 84 having a downwardly extending shaft 85 which extends through the bushing 83 and has a drum 86 rigidly secured thereto in any suitable manner. A pair of vertical ports 87 and 88, whose lower ends are rigidly secured to the disc 84, have a clamp bracket 90 rigidly secured to their upper ends with the free end portions 91 of the clamp being movable toward one another by bolts 92 to tighten the clamp bracket about the inner frame portion 94 of the inner section 95 of the catcher frame 96.

The frame also includes a section 98 having a pair of end transverse members or legs 99 and 100 which are telescopical in the tubular socket portions 102 and 103 of the section 94 and rigidly securable thereto by set screws 104. The inner end of a socket portion 103 is connected to one end of the longitudinal portion 94 by an arcuate portion 107 of the frame. The outer section 98 of the frame includes an outer longitudinal portion 108 and a front inwardly and forwardly extending portion 109 which connects the front end of the portion 108 to the outer end of the portion 99.

The movable outer front catcher also has a plastic sheet 112 stretched across and supported on the frame 96 by belts 113 and 114 in the same manner as the inner catcher or deflector.

The rear outer catcher 80a and the means by which it is swingably or pivotally mounted on the rear outer brace frame 32a being similar in structure to the front catcher 80, its elements have been provided with the same reference numerals to which the subscript a has been added, as the corresponding elements of the front catcher member 80.

Figure 2:
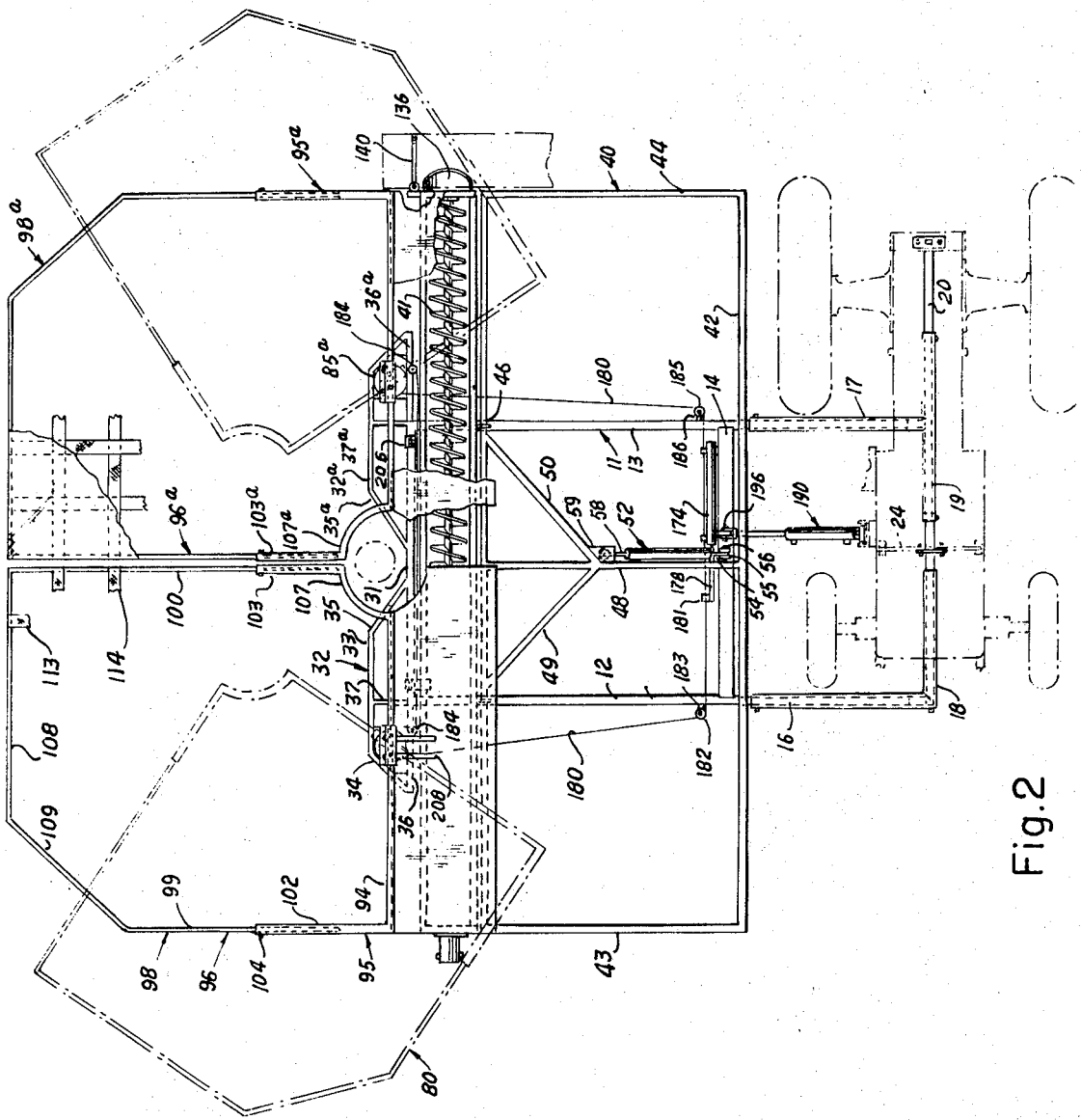
FIG. 2 is a view similar to FIG. 1, with portions of the catchers removed and with other parts broken away.
Figure 3:
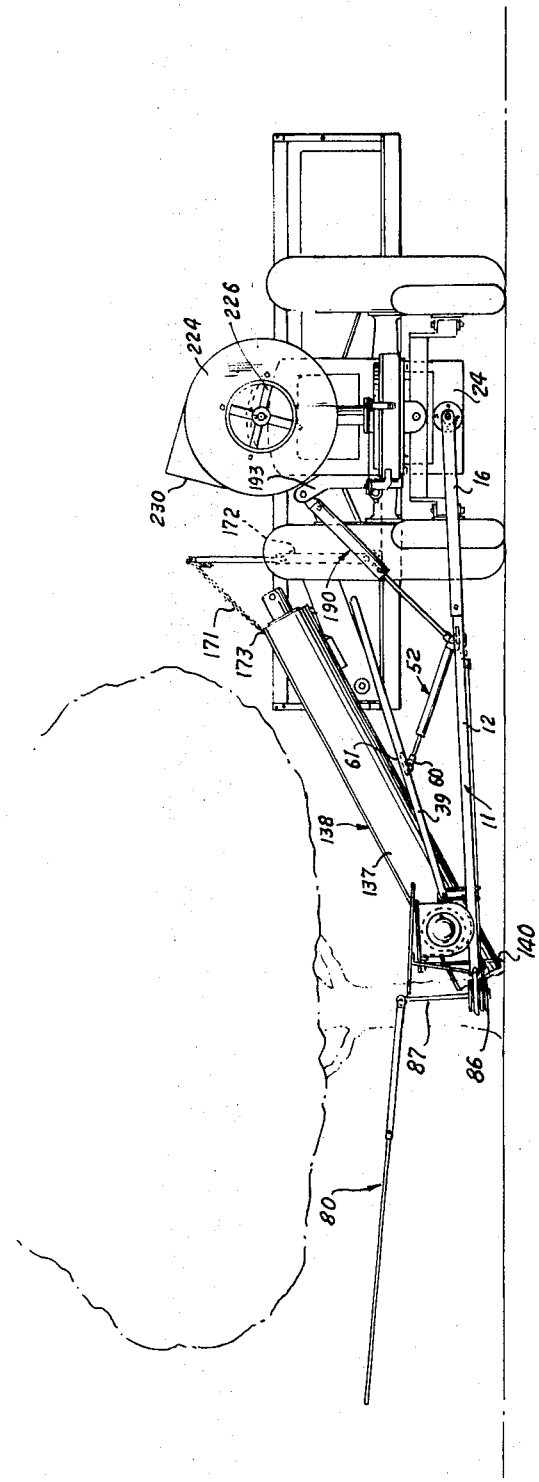
FIG. 3 is a front view of the apparatus showing it in operative position about a tree.
Figure 4:
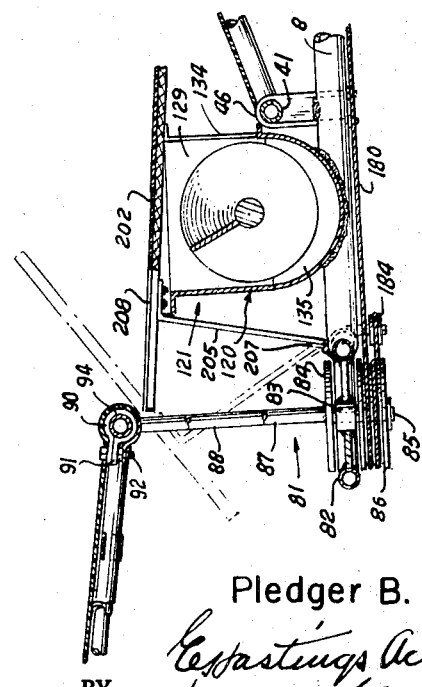
FIG. 4 is a fragmentary sectional view taken on line 4—4 of FIG. 1.

Due to the provision of the upwardly extending vertical rods 87 and 88 of the support assemblies 81 and 81a, the lower ends of the outer catchers or deflectors are spaced above the outer end of the inner catcher 39, as is illustrated in FIGS. 2, 3 and 4, so that the inner longitudinal ends of the outer catchers, when they are in their operative positions, are disposed above and outwardly of the upper end of a trough 120 of a longitudinal conveyor 121. The trough extends inwardly of the outer longitudinal brace member 31 of the main frame and outwardly of the location of the pivotal connection of the longitudinal outer member 42 of the frame 40 of the inner catcher 39. The trough 120 may be rigidly secured to the side members 12 and 13 in any suitable manner as by welds, brackets and the like and includes a helical member or screw 124 which extends longitudinally therethrough whose shaft 130 is journaled at opposite end walls 128 and 129 of the trough.

The front end of the screw shaft is rigidly secured to the drive shaft of a hydraulic motor 132 secured by a suitable mount plate 133 to the front end wall 128 of the conveyor. The outer edge of the screw is preferably spaced from the bottom arcuate surface of the trough so that the fruit harvested which, as will be explained below, enters into the trough through the inner slot 134 thereof which extends substantially the full length of the trough, will be rolled rearwardly and through the aperture or window 135 of the trough rear end wall 129.

The trough is preferably provided with the rearward extension 136 which may extend into a side opening in the trough 137 of an elevator conveyor 138. The outer end of the elevator conveyor is supported on the rear end of the longitudinal conveyor by means of a substantially U-shaped support 140. One end of the support extends through a sleeve 141 welded to an angle bracket 142 which is secured to the trough of the longitudinal conveyor, as by welding, and which extends rearwardly therefrom. The support 140 is held against downward movement by means of a cotter key 143 which extends through a suitable aperture in the upper end of the support and a washer 144. The other end of the support is provided with an upwardly extending lug or pin 145 which is received in a downwardly extending socket 146 welded to the bottom of the flange 147 of the elevator conveyor. The elevator conveyor has a screw 150 whose shaft 151 is appropriately journaled in the end walls 152 and 153 of the trough. The upper end of the shaft 151 is connected to the drive shaft of a hydraulic motor 155 which is secured to the upper end wall 153 of the trough. The trough of the elevator conveyor adjacent its upper end is provided with a lateral extension or chute 156 which extends laterally outwardly therefrom and by means of the conveyor the fruit is moved upwardly in the trough of the elevator conveyor by the screw 150, is delivered to a chute 158 which transfers it to another elevator conveyor 160 mounted on a platform 161. The elevator conveyor 160, which may be of the belt and treadle type, may be driven in any suitable manner, as by a hydraulic motor 162, and discharges the fruit into a receptacle or box 164 positionable on the platform and below the upper end of the elevator conveyor 160. The platform 161 may be mounted on the usual power lift arms 170 of the tractor.

The upper end of the elevator conveyor 138 is supported by a chain 171 one of whose ends is secured to the trough 137. The upper portion of the chain is securable to the outer end of the piston rod 172 of a hydraulic ram 172a whose cylinder 172b is pivotally secured at its lower end to a bracket 173 secured to the platform 161.

The structure of the platform 161, the means by which it is secured to the power lift arms, and the elevator 160 being well known will not be described further.

The outer catchers 80 and 80a are movable between their operative and inoperative positions by a hydraulic ram 174 whose cylinder 175 is rigidly secured by bolts or the like to the brace member 14 of the main frame and whose piston 174 is movable in one direction when fluid under pressure is introduced into one end of the cylinder through the fitting 177 while allowed to exhaust from its other end through its port fitting 178 and in the opposite direction when fluid under pressure is introduced to its cylinder through its port fitting 178 and allowed to exhaust from its port fitting 177. The piston rod 178 has opposite ends of a flexible member or cable 180 connected to its outer end by a suitable bracket 181. The cable extends about a direction changing pulley 182 rotatably mounted on the main frame member 12 by a bracket 183, has several turns thereof wound about the drum 86 of the outer catcher 80, extends about a direction changing pulley 184 mounted on the brace member 36 of the main frame, extends about a direction changing pulley 184a mounted on the brace member 86a, has several turns wound about the drum 85a of the other outer catcher 80a, and then extends about a direction changing pulley 185 mounted on a bracket 186 of the main frame member 186 back to the bracket 181.

It will be apparent that as the piston 178 moves toward its retracted position, the cable causes rotation of the two drums 85 and 85a of the outer catchers 80 and 80a in opposite directions, 80 counterclockwise and 80a clockwise, to move the outer catchers from their operative to their inoperative positions and that as it moves from its retracted to its extended position it moves the catchers in the opposite directions from their inoperative positions to their operative positions.

Figure 5:
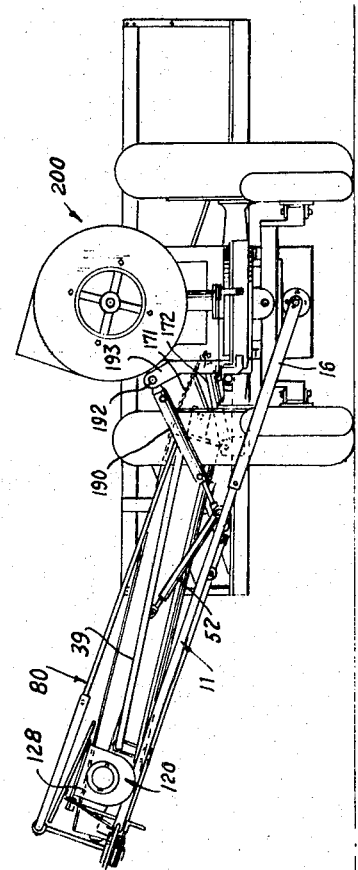
FIG. 5 is a front end view of the apparatus showing all elements thereof in their retracted positions for transport from one location to another.

The main frame 11 is movable between its lower position, illustrated in FIG. 3, to its upper position, illustrated in FIG. 5, by a hydraulic ram 190 whose cylinder 191 has its upper end pivotally connected to the tractor by means of a pin or shaft 192 which extends through aligned apertures in a bifurcated bracket 193 secured in any suitable manner to the tractor body and the sleeve 194 rigidly secured to the upper end of the cylinder 191. The outer end of the piston rod 195 is pivotally secured to a lug 196 on the main frame member 14 by a pin 197 which extends through aligned apertures in the lug 196 and the clevis on the end of the piston rod. It will be apparent that the piston 198 and its piston rod will be moved upwardly in the cylinder when hydraulic fluid is introduced into the lower end of the cylinder through its port fitting 199 while fluid is allowed to flow from the under end of the cylinder through its other port fitting 200 and that the piston and its rod will move downwardly in the cylinder when fluid under pressure is introduced into the upper port fitting and allowed to escape from the lower port fitting.

A pair of covers 202 and 203 extend over the conveyor trough from below the inner edges of the outer catchers 80 and 80a when they are in their operative positions to above the outer edge of the inner catcher so that the fruit or nuts cannot fall directly downwardly into the trough 120 but must roll over the covers and fall on the inner catcher and then roll downwardly thereover into the trough.

The covers 202 and 203 are secured as by bolts, to the upper ends of bars 205 and 206 whose lower ends are pivotally secured to the main frame member 31 by hinges 207. The covers have slots 208 in which the rods in which the outer catchers are mounted are received when the covers are tilted upwardly to facilitate access to the trough for inspection of the conveyor or other purpose.

A blower assembly 210 is mounted on the front end of the tractor and includes a platform 211 mounted on angle members 213 and 214 secured to the tractor. A base 215 is secured by bolts to the platform and supports a column 217 which is rotatably journaled on the base in any suitable manner. The column has a drum 218 rigid therewith. An internal combustion engine 219 is mounted on the shaft 217 and its drive shaft is connected to the drive shaft 220 of a squirrel cage blower 222. The housing 224 of the blower is rotatably mounted on the shaft 225 by means of suitable spiders 226. The squirrel cage blower housing, of course, has the usual side inlet opening 228 and an outlet 230. The housing is rotatable on the shaft 225 to vary vertically the direction of the air being delivered through the outlet 230 by means of a hydraulic ram 231. The lower end of the cylinder 232 of the ram is pivotally connected, as by a pin 234, to a bracket 235 rigid with the motor. The outer end of its piston 236 is pivotally connected to a shaft 238 which is connected to the housing 224 in any suitable manner. The shaft 238 is offset from the central axis of the housing and of the blower shaft 220 so that when hydraulic fluid is introduced into the lower port fitting 242 of the hydraulic cylinder below its piston 243, while simultaneously the hydraulic fluid is allowed to escape from the upper end of the cylinder through the port fitting 245, the piston is moved to its extended piston and the blower housing is rotated in a clockwise direction, as viewed in FIG. 3, to direct the air blown thereby upwardly. Conversely when fluid under pressure is introduced into the upper fitting 245 while fluid is allowed to flow from the cylinder from its fitting 242, the housing is rotated in a counterclockwise manner to move its outlet downwardly.

The blower is rotatable about the vertical central axis of the post 217 by a hydraulic ram 250 whose cylinder 251 is rigidly secured to the platform 211 in any suitable manner. The ends of a cable 252 are connected to the outer end of the piston rod 253 of the ram in any suitable manner. The cable 252 extends from the piston rod about the direction changing pulleys 254, 255 and 256, has several turns thereof wound about the drum 218 of the post, and extends about a direction changing roller pulley 255 and back to the piston.

It will be apparent that when hydraulic fluid under pressure is introduced into the port fitting 257 of the cylinder 251 while it is allowed to flow from the opposite end of the cylinder through the port fitting 258, the piston 259 and the piston rod will move forwardly and the post and therefore the blower will be rotated by the cable in a clockwise direction, as viewed in FIG. 1, and conversely, when fluid under pressure is introduced into the cylinder through the port fitting 258 and allowed to flow from the cylinder through the port fitting 257, the piston and piston rod are moved rearwardly and the post and blower are rotated in a counterclockwise manner.

The hydraulic fluid under pressure for the operation of the hydraulic rams is provided by a suitable pump 262 which may be either the usual pump provided on the tractor as part of its original equipment or may be an additional pump mounted at any suitable location on the tractor. The pump 262, the reservoir 263, and the various conduits have not been shown in FIGS. 1 through 9 to permit better illustration of the other components of the apparatus.

The pump 262 may be of any suitable type having internal control means for regulating the pressure at its outlet 265, such as a bypass having a pressure regulator valve therein between its outlet 265 and its inlet 266. The inlet of the pump is connected to the reservoir by a suitable pipe 267.

Four way valves V1, V2, V3, V4, V5 and V6, which may have manual operator handles 268 control the flow of fluid to and from the rams 174, 52, 190, 230 and 250, respectively. The valves are preferably mounted on the tractor within reach of the operator when seated on the tractor seat as shown in FIG. 1. Each of the valves has an inlet port fitting P1 which is connected to the main pressure conduit 270 which is connected to the outlet 265 of the pump and an exhaust port fitting P2 which is connected to the exhaust conduit 271 which extends to the reservoir 263. The valves also have port fittings P3 and P4.

The control valves may be of any suitable type which in a first position of the operator handle prevent any fluid flow between any of their port fittings P1, P2, P3, and P4, in a second position of the handle place the port fitting P1 in communication with the port fitting P3 and simultaneously the port fitting P2 in communication with the port fitting P4, and in a third position of the handle place the port fitting P1 in communication with the port fitting P4 and the port fitting P2 in communication with the port fitting P3.

The hydraulic motors for rotating the screws of the longitudinal conveyor 120 and the elevator conveyor 138 are connected in series between the main hydraulic lines 270 and 271 so that when the pump is in operation, the motors are driven simultaneously at the same speed. The ports P3 and P4 of each valve are connected to the opposite port fittings of the cylinder of the ram whose operation the valve controls. For example, the ports P3 and P4 of the valve V1 are connected to the port fittings 177 and 178, respectively, of the cylinder 175 of the ram 174.

In use, when it is desired to transport the harvester from one location to another, as for example, from a barn to an orchard, the elements of the harvester are moved to the positions illustrated in FIG. 5 with the piston rods of the rams 52 and 190 being in their retracted positions so that the main frame 11 is raised and the inner catcher is in its lower position relative to the main frame. The piston rod of the ram 174 is now also in its fully retracted position so that the outer catchers 80 and 80a are in positions wherein they overlie the inner catcher. The relatively loose mounting of the elevator conveyor 138 on the longitudinal conveyor 121 and the chain permits it to assume the position illustrated in the drawing in FIG. 5. The length of the chain 171 is adjusted as required and the elevation of the inner end of the elevator conveyor is also adjustable by operation of the ram by means of the valve V6.

When the tractor reaches the orchard the operator places the pump 262 in operation by proper manipulation of its control and operates the valve V3 to cause hydraulic fluid under pressure to be introduced into the upper end of the cylinder of the ram 191 by connecting it to the pressure hydraulic conduit 270 and connects its port fitting 196 to the exhaust hydraulic conduit 271 so that the piston of the hydraulic ram rod 195 of the ram will move downwardly and the main frame is moved to its operative position, illustrated in FIG. 3, and then operates the valve V3 to place it in position wherein fluid may neither enter nor exhaust from either end of the cylinder 191 of the hydraulic ram 190. The operator may adjust the length of the chain 171 between the post and the trough 137 of the elevator conveyor so that it will be in proper position to deliver fruit to the chute 158 of the conveyor 160.

The operator then drives the tractor to one side of a tree from which the fruit or nuts are to be harvested until the tree trunk is in alignment between the inclined main frame members 35 and 35a and then turns the tractor to the right, FIG. 1, to cause the main frame to reach the position relative to the tree trunk illustrated in FIGS. 1 and 2 wherein the tree trunk is disposed between the frame members 35 and 35a. The operator then operates the operator handle 268 of the valve V1 to cause the port fittings 177 and 178 of the cylinder 175 of the ram 174 to be connected to the pressure and exhaust conduit 270 and 271, respectively, so that the piston rod 178 moves to the left, as seen in FIG. 2, and causes the outer catchers 80 and 80a to be pivoted in opposite directions from above the inner catcher to the positions illustrated in FIGS. 1 and 3 wherein they are disposed outwardly of the trough. The valve is then placed in position where it prevents fluid flow from either of the port fittings of the cylinder 175 so that the catchers are now held in this position.

The valve V2 is then operated to cause fluid under pressure to be introduced to the port fitting 64 from the pressure condit 270 and its port fitting 66 to be connected to the exhaust conduit 271 so that the piston rod 58 moves towards its extended position pivoting the inner catcher 39 to a downwardly and outwardly inclined position as illustrated in FIG. 3. The valve V2 is then placed in position wherein it prevents flow into or from both port fittings of the cylinder thus causing the inner catcher to remain in this position. The tree harvester is now in position to catch any fruit which may fall from the branches of the tree.

The blower motor is then started and the operator by appropriate manipulation of the operator handles of the valves V4 and V5 causes the blower to direct a blast or current of air at progressively different crop laden branches of the tree to cause the fruit on the branches of the tree to be dislodged or disconnected therefrom. Any fruits falling on the outer catchers roll downwardly thereon onto the trough covers 202 and 203, then onto the inner catcher and thence through the opening 134 of the trough 120 into the trough. The screw of the longitudinal conveyor 120 now rolls the fruit along the bottom of the trough 137 to the rear end thereof and through the chute 136 into the lower end elevator conveyor. The screw 150 of the elevator conveyor which is being rotated in the proper direction by the hydraulic motor 155 rolls the fruit to the upper end of the elevator conveyor trough 137 for delivery to the other elevator conveyor 160 and thence to the receptacle 164. The hydraulic motor 155 which operates the conveyor 160 may also be connected across the pressure and exhaust conduits 270 and 271.

When all of the fruit has been harvested from a particular tree, the operator by proper manipulation of the valve V2 then causes the inner catcher 39 to be moved downwardly to a position substantially parallel to the main frame and then by proper manipulation of the valve V1 causes the piston 178 of the hydraulic ram 174 to move toward retracted position thus causing the outer catchers to pivot in opposite directions to a position again overlying the trough 120 and the inner catcher. The operator then turns the tractor to the left, FIG. 1, until the brace frames 32 and 32a are clear of the tree trunk and then proceeds to the next tree whose crop is to be harvested whereupon he repeats the operation above described.

When it is time to transport the harvester to another location of use or storage, the operator when the outer catchers are in their inoperative positions, operates the valve V3 to raise the main frame to the position illustrated in FIG. 5 and with the harvester thus raised and retracted to minimum lateral width to clear obstacles and the tractor may then easily transport the harvester.

The harvester is made of very light weight materials, the frames of its various catchers being of a tubular light metal whose members are welded to one another and the longitudinal conveyor and the elevator conveyor being made of a relatively thin metal as are their screws.

It will be seen that a single operator who drives the tractor may operate the blower and the various rams from his seat on the tractor.

It will further be seen that the provision of a blower on the vehicle permits fruits, such as peaches, apples, pears and the like to be blown off the branches of a tree below which the catchers are disposed since the direction in which the air is delivered by the blower may be varied as required.

It will also be apparent that the plastic sheets which are stretched across the catcher frames do not bruise the fruit, and, since the trough covers 202 and 203 are covered by a soft resilient substance or coat C any fruits falling directly thereon also are not bruised or damaged.

It will further be seen that the provision of the trough covers 202 and 203, and the location of the lower edges of the inner catchers above and outwardly of the trough and of the lower end of the inner catcher inwardly and below the upper edges of the trough prevents the fruit from falling directly on the metal trough 120 or its screw which would result in bruising of the fruit.

It will further be seen that the conveyor screws roll the fruit along the troughs so that it slides over the trough.

It will be apparent that if the harvester is used to harvest tree crops of relatively small sizes, such as pecans and the like, the screws of the conveyors would be of larger size so that their outer edges would be closest to the bottom of the trough or else would be provided with a resilient strip extending from the outer edge of the screw throughout its length which could actually slide along the inner surface of the bottom portion of the trough.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A tree harvester connectible to a vehicle having a seat for an operator, said tree harvester including: a main frame connectible to a vehicle for pivotal movement about a first horizontal axis adjacent the vehicle between a lower position wherein said main frame extends substantially horizontally and a raised position, said frame extending outwardly of the vehicle when connected thereto and extending outwardly and upwardly relative to the vehicle when in said raised position; a substantially rectangular elongate inner catcher pivotally mounted on said main frame for pivotal movement relative to said main frame when said main frame is in said lower position about a second horizontal axis parallel to said first axis and spaced therefrom outwardly relative to the vehicle, said inner catcher being pivotally movable between an operative position wherein said inner catcher extends upwardly at an angle from said frame toward the vehicle and an inoperative position wherein said inner catcher extends substantially parallel to and adjacent said main frame; conveyor means carried by said frame and disposed outwardly from said inner catcher for receiving objects falling on said inner catcher and rolling downwardly and outwardly thereon when said inner catcher is in said operative position for delivering objects to one end of said inner catcher; and a pair of outer catchers mounted on said frame for pivotal movement about vertical axes spaced longitudinally of said conveyor means, when said inner catcher is in said inoperative position, between operative positions wherein said outer catchers slope upwardly and outwardly from said conveyor means and relative to the vehicle and inoperative positions wherein said outer catchers overlie said inner catchers.

2. The harvester of claim 1, and means operable from the seat of a vehicle to which the harvester is connectible for moving said main frame, said inner catcher and said outer catchers between said operative and inoperative positions.

3. The harvester of claim 2, and drive means for rotating said conveyor means.

4. The harvester of claim 3, wherein the outer edge of said inner catcher is disposed below the inner edges of said outer catchers when said catchers are in their operative positions and the lower inner edges of said outer catcher are disposed above said conveyor means; and cover means over said conveyor means whereby articles falling on said outer catchers when said outer catchers are in their operative positions roll downwardly thereon to and over said cover means and onto said inner catcher for movement thereon to said conveyor means.

5. The harvester of claim 4 wherein said operator means comprise first, second and third hydraulic rams, said first ram being connected between said main frame and a vehicle, said second ram being connected between said main frame and said inner catcher, and said third ram being mounted on said main frame; and cable and drum means operatively associated with said third ram and said outer catchers for moving said outer catchers simultaneously in opposite directions about said vertical axes between said operative and inoperative positions.

6. The tree harvester of claim 5, and blower means mountable on the vehicle for directing a current of air at the branches of a tree below which said catchers are in their operative positions for dislodging the crop from the tree for fall onto the catchers.

7. The tree harvester of claim 6, wherein said blower is movable to vary the direction of flow of the current of air produced thereby.

8. The harvester of claim 1 wherein said conveyor means includes a trough having a screw mounted therein for moving the objects received in said trough to one end thereof for discharge therefrom; and drive means for rotating said screw.

9. The harvester of claim 1, and drive means for operating said conveyor means.

10. The harvester of claim 9, wherein the outer edge of said inner catcher is disposed below the inner edges of said outer catchers when said catchers are in their operative positions and the lower inner edges of said outer catcher are disposed above said conveyor means; and cover means over said conveyor means whereby articles falling on said outer catchers when said outer catchers are in their operative positions roll downwardly thereon to and over said cover means and onto said inner catcher for movement thereon to said conveyor means.

11. The harvester of claim 10, and operator means for moving said main frame, said inner and outer catchers and a blower comprising first, second and third hydraulic rams, said first ram being connected between said main frame and a vehicle, said second ram being connected between said main frame and said inner catcher, and said third ram being mounted on said main frame; and cable and drum means operatively associated with said third ram and said outer catchers for moving said outer catchers.

12. The tree harvester of claim 11, with said blower means mounted on the vehicle for directing a current of air at the branches of a tree below which said catchers are in their operative positions for dislodging the crop from the tree for fall onto the catchers.

13. The tree harvester of claim 12, wherein said blower is movable to vary the direction of flow of the current of air produced thereby; and means for moving said blower.

References Cited

UNITED STATES PATENTS

| | | | |
|---|---|---|---|
| 3,145,521 | 8/1964 | Herbst | 56—329 |
| 3,338,041 | 8/1967 | Arpin | 56—329 |
| 3,455,502 | 7/1969 | Pool et al. | 56—328 X |

LOUIS G. MANCENE, Primary Examiner

J. N. ESKOVITZ, Assistant Examiner